Figure 1:
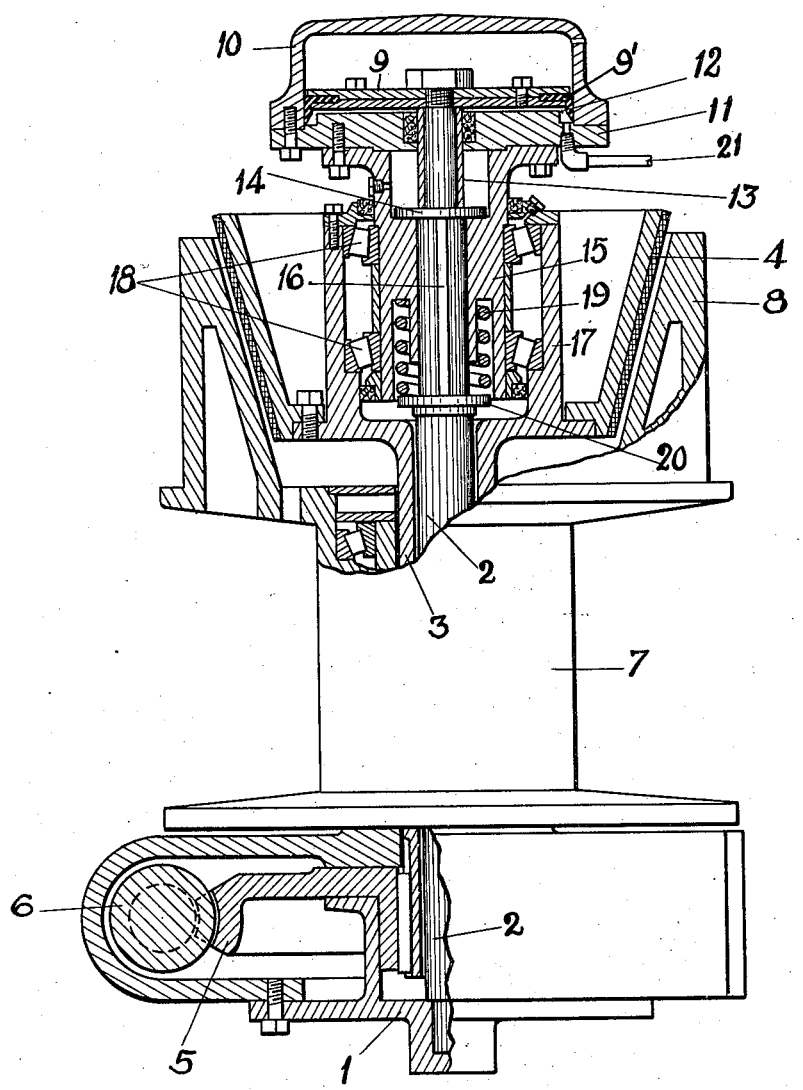

Nov. 13, 1945.          L. B. LINDSLEY          2,388,857
                    PNEUMATIC CLUTCH CONTROL
                      Filed Oct. 19, 1942

INVENTOR
Lawrence B. Lindsley
By: J. E. Trabucco
ATTORNEY

Patented Nov. 13, 1945

2,388,857

UNITED STATES PATENT OFFICE 2,388,857

PNEUMATIC CLUTCH CONTROL

Lawrence B. Lindsley, Los Gatos, Calif.

Application October 19, 1942, Serial No. 462,636

6 Claims. (Cl. 192—85)

This invention relates to pneumatic clutch controls and it has for its primary object the provision of an improved pneumatically operated clutch control for drums or other rotatable devices.

A further object of my invention is to provide an improved pneumatic clutch control for drums or other rotatable devices, having a self-adjustable structure which insures the proper operative engagement of the clutch elements irrespective of whether their contacting surfaces have previously become worn from frictional engagement one with another.

Other and further objects of my invention will be pointed out hereinafter, or will be indicated in the appended claims, or will be obvious to one skilled in the art upon an understanding of the present disclosure. For the purpose of this application I have elected to show herein certain forms and details of a pneumatic clutch control representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims, short of the true and most comprehensive scope of the invention in the art.

In the accompanying drawing illustrating the preferred embodiment of my invention:

Fig. 1 is a side elevation, partly in section, of a pneumatic clutch control for effecting the frictional engagement of a driving element with a single driven element.

Referring to Fig. 1, the numeral 1 designates a base member having a substantially vertical stationary shaft 2 supported thereby. Rotatably and slidably supported on the shaft 2 is a sleeve 3 having a driving clutch element 4 carried at its upper end. Splined to the lower end of the rotatable sleeve 3 is a worm wheel 5 having a worm gear 6 operatively engaging therewith. The worm gear is rotated in the usual manner by a suitable source of power applied thereto. Mounted for independent rotary movement on the sleeve 3 is a drum 7 having a driven clutch element 8 provided at its upper end. The clutch elements are so disposed with respect to one another that the adjustment downwardly of the driving element 4 will cause its frictional engagement with the driven element 8, thereby effecting the rotation of the drum 7.

Secured to the upper end of the vertical shaft 2 is a stationary piston 9 which is positioned inside a vertical reciprocable cylinder 10. The lower side of the cylinder 10 is secured to a plate 11 which encloses the lower side of an air chamber 12 formed in the cylinder beneath the stationary piston 9. The stationary shaft 2 extends axially through the plate 11, and a bushing 13 interposed between the piston 9 and a ring 14 provides a bearing surface for the vertical reciprocatory movement of the said plate. Secured as by bolts to the plate 11 is a depending tubular member 15 through which the stationary shaft 2 extends. The tubular member is secured as by vertical splines 16 to the shaft 2 and its vertical reciprocation is thereby permitted but not its rotation.

Positioned in coaxial but spaced relation to the tubular member 15 is an annular upstanding flange 17 secured to and carried by the sleeve 3. Interposed between the flange 17 and the tubular member 15 are a number of roller bearings 18 which permit the rotation of the said flange with respect to the said tubular member.

A coil spring 19 extending around the shaft 2 and compressed between a stationary ring 20 and the tubular member 15 exerts an upward force upon the said member, the plate 11 and the cylinder 10.

Connecting with the air chamber 12 of the cylinder 10 is an air carrying conduit 21 which is normally connected to a source of supply for compressed air and is provided with a suitable valve (not shown) for controlling the flow of air to the said chamber.

The piston 9 is provided at its periphery with a sealing washer 9' which engages the wall of the cylinder 10 and prevents the escape of air from the chamber 12. The usual grease induction fittings and packing glands are provided as indicated on the drawing.

To bring the driving clutch element 4 into frictional engagement with the driven clutch element 8 air under pressure is directed through the conduit 21 to the air chamber 12 of the cylinder 10. The air pressure in the chamber exerts a downward force upon the plate 11 of the cylinder 10, thereby causing the unit comprising the said plate, the cylinder, the tubular member 15, the roller bearings 18, the rotating flange 17, the rotating clutch element 4 and the rotating sleeve 3, to be forced downwardly against the tension of the coil spring 19. The downward movement of the driving clutch element 4 into operative engagement with the driven clutch element 8 causes the rotation of the latter. The maintenance of suitable air pressure in the chamber 12 of the cylinder 10 will cause the continued rotation of the driven clutch element 8 and the drum 7. The release of the air from the chamber 12 will cause a discontinuance of the downward pressure on the plate 11, thereby enabling the coil spring 19 to exert an upward force capable of returning the various aforementioned reciprocable parts of the device to their normal positions wherein the driving clutch element 4 no longer engages with the clutch element 8.

Having described my invention, what I claim is:

1. In a pneumatic clutch control, a stationary shaft, a reciprocable driving sleeve rotatably and adjustably mounted on the shaft, a rotatable device mounted on and rotatable independently of the sleeve, a driven clutch element secured to the rotatable device, a driving clutch element secured to the sleeve and arranged to operatively engage with the driven clutch element when the sleeve is adjusted in one direction of its reciprocable movement, a stationary piston mounted on the shaft, a reciprocable casing within which the piston is positioned, the said piston and the casing providing a closed air chamber, air inlet means for supplying air under pressure to the chamber whereby the casing may be reciprocated in one direction of its movement, a non-rotatable member secured to and carried by the casing and mounted for reciprocating motion on the shaft, and means connecting the non-rotatable member and the rotatable sleeve, whereby the sleeve and the driving clutch element may be adjusted to a position where the clutch elements are in operative engagement while at the same time the sleeve and the driving clutch element are allowed to rotate.

2. In a pneumatic clutch control, a stationary shaft, a reciprocable driving sleeve rotatably and adjustably mounted on the shaft, a rotatable driven clutch element, a driving clutch element secured to the sleeve and arranged to operatively engage with the driven clutch element when the sleeve is adjusted in one direction of its reciprocable movement, a stationary piston mounted on the shaft, a reciprocable casing within which the piston is positioned, the said piston and the casing providing a closed air chamber, air inlet means for supplying air under pressure to the chamber whereby the casing may be reciprocated in one direction of its movement, a non-rotatable member secured to and carried by the casing and mounted for reciprocating movement on the shaft, means connecting the non-rotatable member and the rotatable sleeve whereby the sleeve and the driving clutch element may be adjusted to a position where the clutch elements are in operative engagement while at the same time the sleeve and the driving clutch element are allowed to rotate, and means for returning the sleeve, the non-rotatable member, and the casing to their normal positions whereby the clutch elements are disengaged.

3. In a pneumatic clutch control, a driven clutch element, a driving clutch element adjustably arranged to engage with the driven clutch element, a stationary piston, a reciprocable and non-rotatable casing within which the piston is positioned, the said piston and the casing providing a closed air chamber, air inlet means for supplying air under pressure to the chamber whereby the casing may be reciprocated in one direction of its movement, a non-rotatable member secured to and carried by the casing and mounted for reciprocating movement, and means connecting the non-rotatable member and the driving clutch element whereby the driving clutch element may be adjusted to a position where the clutch elements are in operative engagement while at the same time the driving clutch element is allowed to rotate.

4. In a pneumatic clutch control, a driven clutch element, a driving clutch element adjustably arranged to engage with the driven clutch element, a stationary piston, a reciprocable and non-rotatable casing within which the piston is positioned, the said piston and the casing forming a closed air chamber, air inlet means for supplying air under pressure to the chamber whereby the casing may be reciprocated in one direction of its movement, spring means for urging the casing in the opposite direction of its movement, a non-rotatable member secured to and carried by the casing and mounted for reciprocatory movement with the casing, and means connecting the non-rotatable member and the driving clutch element whereby the driving clutch element may be adjusted to a position where the clutch elements are in operative engagement while at the same time the driving clutch element is allowed to rotate.

5. In a pneumatic clutch control, a driven clutch element, a driving clutch element adjustably arranged to engage with the driven clutch element, a reciprocable and non-rotatable casing, a stationary piston in the reciprocable casing, the said piston and casing forming a closed air chamber, means for supplying air under pressure to the air chamber, and means operatively connecting the driving clutch element and the casing whereby upon movement of the casing in one direction of its reciprocatory movement the driving clutch element may be moved to engage with the driven clutch element while at the same time the driving clutch element is allowed to rotate.

6. In a pneumatic clutch control, a driven clutch element, a driving clutch element adjustably arranged to engage with the driven clutch element, a reciprocable and non-rotatable casing, a stationary piston in the reciprocable casing, the said piston and casing forming a closed air chamber, means for supplying air under pressure to the air chamber, means operatively connecting the driving clutch element and the casing whereby upon movement of the casing in one direction of its reciprocatory movement the driving clutch element may be moved to engage with the driven clutch element while at the same time the driving clutch element is allowed to rotate, and means for automatically returning the driving clutch element and the casing to their normal positions upon release of the air pressure in the chamber.

LAWRENCE B. LINDSLEY.